United States Patent [19]
Lagarde et al.

[11] Patent Number: 5,943,098
[45] Date of Patent: Aug. 24, 1999

[54] TELEVISION IMAGE FORMAT NON-LINEAR CONVERSION DEVICE

[75] Inventors: Jean-Pierre Lagarde, Saint Martin le Vinoux; Patrice Leurent, Saint Egreve, both of France

[73] Assignee: SGS-Thomson Microelectronics S.A., Saint Genis, France

[21] Appl. No.: 08/931,711

[22] Filed: Sep. 16, 1997

[30]     Foreign Application Priority Data

Sep. 20, 1996  [FR]  France ..................... 96 11682

[51] Int. Cl.⁶ ....................................... H04N 7/01
[52] U.S. Cl. ..................... 348/445; 348/441; 348/704
[58] Field of Search .................... 348/445, 581, 348/441, 704, 718, 714, 716

[56]           References Cited

U.S. PATENT DOCUMENTS

| | | | |
|---|---|---|---|
| 3,806,644 | 4/1974 | Browne et al. | 348/445 |
| 4,868,656 | 9/1989 | Geiger | 348/448 |
| 4,920,407 | 4/1990 | Stoddard | 348/718 |
| 5,343,256 | 8/1994 | Kimura et al. | 348/718 |
| 5,673,086 | 9/1997 | Fukuoka et al. | 348/445 |

FOREIGN PATENT DOCUMENTS

A-0 276 985  8/1988  European Pat. Off. ......... H04N 5/44

OTHER PUBLICATIONS

French Search Report from French Patent Application 96 11682, filed Sep. 20, 1996.
Patent Abstracts of Japan, vol. 95, No. 6, Jul. 31, 1995 & JP–A–07 067046 (NEC).
Patent Abstracts of Japan, vol. 95, No. 6, Jul. 31, 1995 & JP–A–07 067045 (Mitsubishi Electric).
Patent Abstracts of Japan, vol. 96, No. 3, Mar. 29, 1996 & JP–A–07 298086 (Toshiba).

*Primary Examiner*—Victor R. Kostak
*Attorney, Agent, or Firm*—Wolf, Greenfield & Sacks, P.C.

[57]            ABSTRACT

The present invention relates to a device for converting a television image format including two memories for storing image lines, alternatively switched in the read and write mode, and a control circuit issuing to these memories a first write frequency and a second read frequency, the control circuit including programmable means for generating said frequencies controlled by a horizontal synchronization signal, the read frequency being programmed to follow a predefined variation law having a period corresponding to the duration of one scanning line.

63 Claims, 3 Drawing Sheets

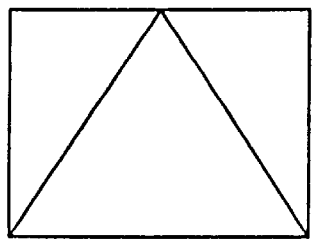
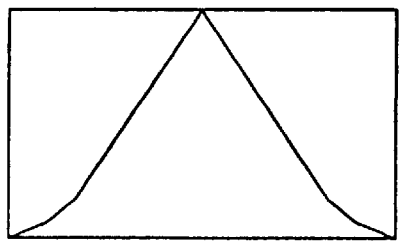
Fig 1A                                   Fig 1B
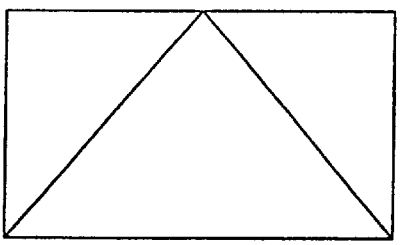
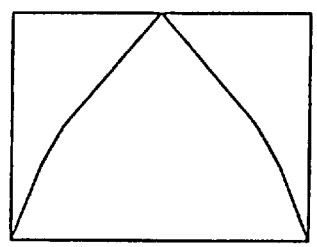
Fig 1C                                   Fig 1D
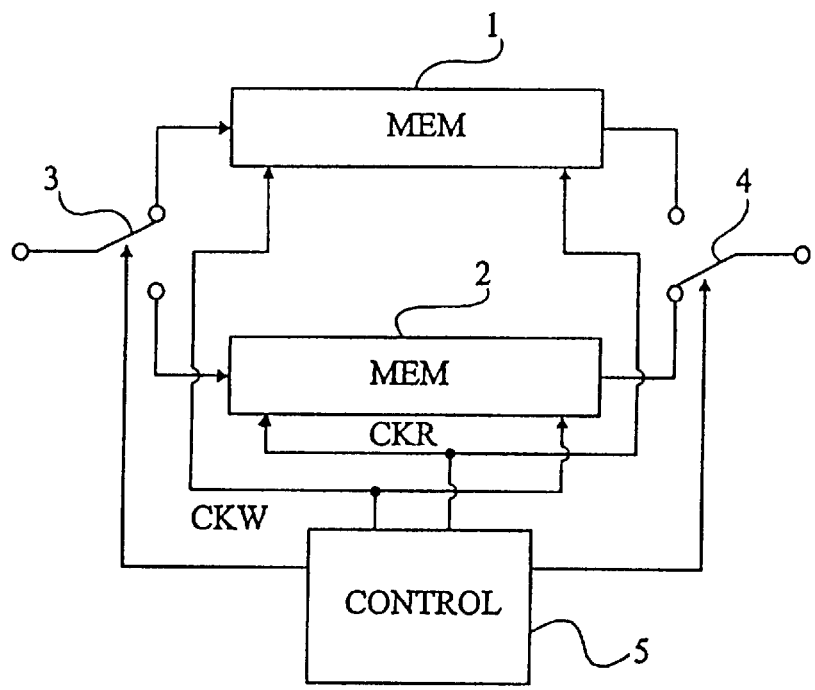
Fig 2

TELEVISION IMAGE FORMAT NON-LINEAR CONVERSION DEVICE

BACKGROUND OF THE INVENTION

1. Field of the Invention

The present invention relates to a device for converting image formats for display on a television set having a different format than the image format. The present invention more specifically applies to such a device performing a non-linear conversion.

2. Discussion of the Related Art

Television screens are currently available in two standardized formats, respectively 4/3 and 16/9, which define the width of the screen with respect to its height. Images to be displayed on the screen are likely to be broadcast according to these two formats. If the images are received in a format different from that of the screen, the images are generally compressed or expanded prior to their display to avoid having the images significantly deformed upon display.

The distortion (compression or expansion) performed on the images can be performed vertically and/or horizontally. The present invention more specifically relates to a device for converting the image format by performing a horizontal distortion.

A so-called panorama display mode has recently been provided, which consists in performing a horizontal non-linear distortion of the images to be displayed in a different format. This display mode enables display of the image in full screen by minimizing the distortion in the central area of the screen and by enhancing the distortion on the edges. Thus, the appearance of very large black bands on both sides of the images or a loss of the image edges is avoided, while minimizing the distortion which can be perceived by the user.

FIGS. 1A to 1D schematically illustrate the panorama display mode. FIGS. 1A and 1C show, respectively, images in format 4/3 and 16/9. FIGS. 1B and 1D schematically show the display of the images shown, respectively, in FIGS. 1A and 1C, on a screen, respectively, in format 16/9 and in format 4/3. In the representation of FIGS. 1A to 1D, for example, an image defining a triangle has been shown, which constitutes a geometric figure illustrating particularly well the distortion performed in panorama mode.

For the display of an image in format 4/3 (FIGS. 1A and 1B) on a screen at format 16/9, the image is expanded horizontally. Preferably, the central area of the image does not undergo any modification while the expansion becomes greater as one approaches the edges of the image.

For the display of images in format 16/9 on a screen at format 4/3, (FIGS. 1C and 1D), a non-linear compression is performed instead of an expansion.

FIG. 2 shows an example of a conventional non-linear compression digital device.

This device includes two memories 1 and 2 associated with input and output switches, respectively, 3 and 4, for selecting the memory used for writing and that used for reading. Each memory 1 or 2 is capable of storing all the video data relating to one line of the image, that is, both the luminance information (Y) and the chrominance information (for example, B-Y and R-Y). Memories 1 and 2 and switches 3 and 4 are associated with a control circuit 5 for selecting, for each line, which of memories 1 and 2 which is to be in the write mode and which is to be in the read mode. Thus, an image line, for example, in format 4/3, is stored at the rate of a first clock CKW in one of the memories, for example, memory 1, while the content of the other memory, for example memory 2, which is read at the rate of a second clock CKR for displaying this image in format 16/9. Analog-to-digital and digital-to-analog converters (not shown) are respectively associated with the circuit inputs and outputs.

To implement a non-linear distortion while respecting the image rate, clock CKW is usually a fixed-frequency clock and clock CKR is a variable-frequency clock, having its mean frequency on a display line corresponding to the frequency of clock CKW.

Write frequency CKW corresponds to the acquisition frequency of the line pixels while read frequency CKR corresponds to the display frequency of the pixels.

Clock CKR is generally frequency modulated so that, for a linear expansion, its frequency is lower than that of clock CKW at the beginning and at the end of each line, and so that its frequency is slightly higher than that of clock CKW in the central portion of each line. The image thus is, in practice, slightly distorted in its central portion.

A problem which arises in this type of device relates to obtaining write and read clocks, respectively CKW and CKR, of the memories.

Generally, frequencies CKW and CKR are obtained by means of analog phase-locked loops (PLL). A first PLL generates, from a quartz crystal oscillator and by means of a first voltage-controlled oscillator (VCO), frequency CKW. Frequency CKW is controlled by a horizontal synchronization signal Hsync of the received video signal. A second PLL generates, from frequency CKW and by means of a second VCO, frequency CKR. An analog disturbance signal is added to the control signal of this second VCO to render variable the control frequency of the VCO. This disturbance represents a predefined non-linear variation law which corresponds to the distortion desired for read frequency CKR.

Obtaining this disturbance signal is particularly difficult. Indeed, this analog signal has to represent, precisely, the desired variation law.

Moreover, the disturbance signal has to be synchronous with frequency CKR, and thus controlled by the horizontal scanning variable frequency, on the display side, since the variation law is repeated with a period corresponding to the duration of a line. This makes the implementation of the circuits for generating frequencies CKW and CKR particularly complex.

Another disadvantage of conventional conversion devices is that they are dedicated to one type of conversion. For example, if a device is meant to perform a non-linear expansion of the image for a conversion of images in format 4/3 to a display in format 16/9, the device used is dedicated to such a conversion.

Japanese patent applications JP-A-07067045 and JP-A-07298086 disclosure conversion devices using an analog signal to carry out a parabolic modulation of the read frequency. These devices have the above-indicated disadvantages.

Japanese patent application JP-A-07067046 discloses a conversion device comprising a circuit for controlling a memory that provides a read clock corresponding either to a clock provided by a PLL receiving the write clock, or to a pulse compressing the clock provided by the PLL. The switching between the two clock modes causes the image to be cut into three fixed areas.

SUMMARY OF THE INVENTION

The present invention aims at providing a new non-linear conversion device which can adapt to different types of conversion.

The present invention also aims at providing a programmable conversion device.

The invention also aims at providing a conversion whatever be the fixed frequency used to obtain the read and write frequencies.

The invention also aims at providing a solution that also applies to the write clock.

To achieve these and other objects, the present invention provides a device for converting a television image format of the type including two memories for storing image lines, alternatively switched in the read and write mode, and a control circuit issuing to these memories a write frequency and a read frequency, the control circuit including programmable means for generating, from a division of a reference frequency, said frequencies controlled by a horizontal synchronization signal, a first frequency being fixed and a second frequency being programmed to follow a predefined variation law of the division rate used for obtaining the second frequency, the periodicity of which corresponds to the duration of one scanning line.

According to an embodiment of the present invention, the variation law is contained in a programmable table including increments to be added, at the rate of the second frequency, to a first division rate for obtaining the first frequency, to obtain a second division rate for obtaining the second frequency.

According to an embodiment of the present invention, the variation law is non-linear.

According to an embodiment of the present invention, the variation law has a null mean value for a scanning line.

According to an embodiment of the present invention, the generation means include an analog phase-locked loop for issuing the reference frequency based on a quartz crystal oscillator, a digital phase-locked loop for issuing, based on the reference frequency and on the first rate, the first frequency controlled by the horizontal synchronization signal, the first rate being a fractional number representing the mean rate of division of the reference frequency by the first frequency, and a digital circuit for generating the second frequency based on the reference frequency and on the second rate.

According to an embodiment of the present invention, the digital loop and the circuit for generating the second frequency each include a frequency synthesizer receiving as an input the reference frequency and, respectively, the first and second rates.

According to an embodiment of the present invention, the generation means include a first analog phase-locked loop for issuing the reference frequency based on a quartz crystal oscillator, a digital phase-locked loop for issuing, based on the reference frequency, a pixel clock controlled by the horizontal synchronization signal, a second analog phase-locked loop for generating the first frequency based on the pixel clock, comprising a voltage controlled oscillator and a first divider programmable by the first rate, this first rate being an integer number, and a second divider, programmable by the second rate and issuing the second frequency based on a frequency issued by the voltage controlled oscillator, the second rate being an integer number.

According to an embodiment of the invention, the first fixed frequency is the write frequency, the second programmed frequency being the read frequency.

According to an embodiment of the invention, the first fixed frequency is the read frequency, the second programmed frequency being the write frequency.

These objects, characteristics and advantages, as well as others, of the present invention, will be discussed in detail in the following non-limiting description of an example of embodiment of the present invention, in relation with the accompanying drawings.

BRIEF DESCRIPTION OF THE DRAWINGS

FIGS. 1 and 2, which have been previously described, are meant to show the state of the art and the problem to solve;

DETAILED DESCRIPTION

An image format conversion circuit according to the present invention has a structure similar to that of a conventional device such as shown in FIG. 2. It uses two memories alternatively for reading and writing to modify the display frequency of the pixels within an image line.

A difference between a conventional device and a device according to the present invention lies in the means used to obtain the write (pixel acquisition) and read (pixel display) clocks of the memories.

Figure 3:
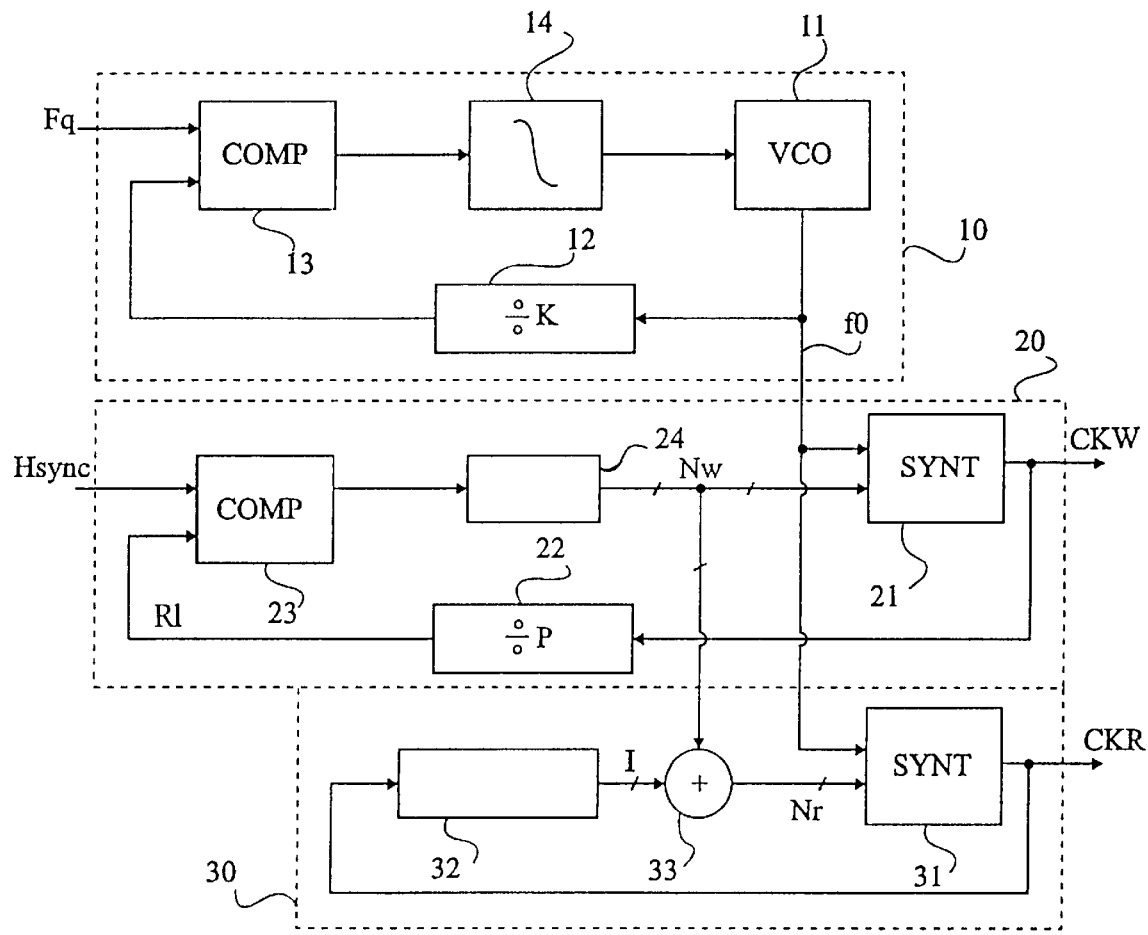
FIG. 3 shows a first embodiment of a programmable clock generation circuit of a conversion device according to the present invention.

FIG. 3 shows a first embodiment of a clock generation circuit according to the present invention.

A characteristic of the present invention is to enable the generation of two synchronous clocks controlled by the horizontal synchronization frequency of the received video signal, one of the clocks being programmable.

The clock generation circuit shown in FIG. 3 includes an analog phase-locked loop (PLL) 10 for supplying, based on a frequency Fq of a quartz crystal oscillator (not shown), a very high reference frequency f0 (for example, of around 200 to 400 MHz). PLL 10 has the conventional structure of an analog PLL issuing a reference frequency. It includes a voltage controlled oscillator (VCO) 11, an output of which issues signal f0. The output of VCO 11 is sent to a divider 12, an output of which is connected to a first input of a phase comparator (COMP) 13 which receives, on a second input, the frequency Fq of the quartz crystal oscillator. The output of comparator 13 is sent to a low-pass filter 14, an output of which is used to control VCO 11.

PLL 10 is associated with a digital PLL 20. PLL 20 is, in this embodiment, meant to supply a clock signal CKW for writing into the memories of the format conversion device, clock CKW being controlled by the horizontal synchronization signal Hsync.

Loop 20 includes a frequency synthesizer 21, a divider 22, a phase comparator 23 and a calculation block 24. Comparator 23 receives, on a first input, horizontal synchronization signal Hsync, a second input being connected to an output of divider 22. Divider 22 has the function of dividing frequency CKW issued by synthesizer 21, to obtain a line reference R1 enabling determination of the phase error with respect to signal Hsync in order to control signal CKW with signal Hsync. The output of comparator 23 issues an error signal to block 24 which determines the period of a pixel of the received video signal, and thus a mean division rate Nw to be applied to signal f0 to obtain frequency CKW. Number Nw is, according to this first embodiment, a fractional number. Frequency synthesizer 21 has the function of dividing frequency f0 by number Nw to obtain signal CKW.

If the rate of divider 12 is K, the mean division rate Nw corresponds to the product of number K by the ratio of frequency Fq over frequency CKW. Divider 22 then is a divider by P, where P stands for the number of pixels in a line.

Figure 4:
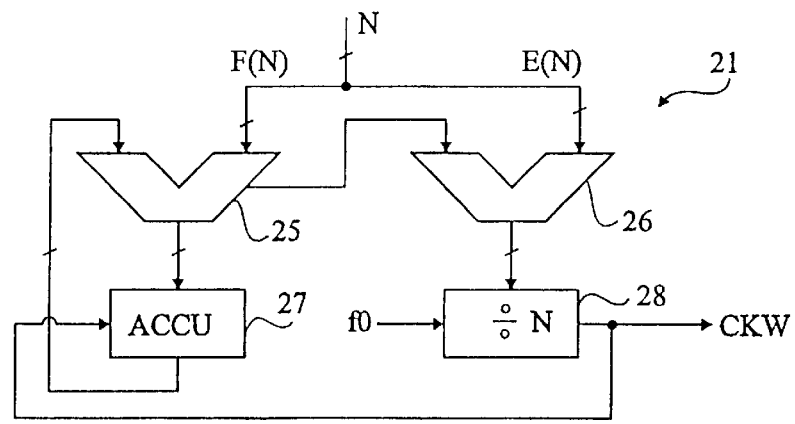
FIG. 4 shows an embodiment of a frequency synthesizer of a circuit such as shown in FIG. 3.

A specific embodiment of a digital frequency synthesizer is shown in FIG. 4.

The synthesizer includes two adders 25 and 26, an accumulator 27 and a divider by N 28. Signal f0 is sent on an input of the divider by N 28, an output of which issues signal CKW. The integer part E(N) of number N, expressed binarily, is sent on a first input of adder 26, the output of which programs divider 28 to set its division rate. The fractional part F(N) of number N is sent on a first input of adder 25, the output of which is sent to accumulator 27. A second input of adder 25 receives an output of accumulator 27. The second input of adder 26 receives the overflow of adder 25. The accumulation of the fractional part F(N) in accumulator 27 is performed at the rate of clock signal CKW.

A feature of the present invention is to use the digital PLL 20 to generate, in this embodiment, a second variable clock signal CKR corresponding to the read frequency of the memories of the conversion device.

According to the present invention, a circuit 30 receives both signal f0 issued by analog PLL 10 and number Nw calculated by digital PLL 20. Circuit 30 includes a frequency synthesizer 31 having a constitution similar to that of frequency synthesizer 21 shown in FIG. 4. The output of synthesizer 31 issues signal CKR for reading from the memories of the conversion device.

According to the present invention, synthesizer 31 performs a digital division of signal f0 by a variable number Nr which corresponds to the sum of number Nw calculated by PLL 20 and of a programmed increment I, contained in a table of increments 32 of circuit 30. Increment table 32 is, for example, contained in a programmable register controlled by signal CKR issued by synthesizer 31. Thus, for each period of signal CKR, and thus, for each pixel period from the point of view of display, register 32 issues an increment I (positive or negative) to be added to number Nw within an adder 33 of circuit 30 to obtain number Nr.

Since number Nw is issued by PLL 20, the obtained signal CKR is effectively controlled by signal Hsync. Moreover, signals CKW and CKR are synchronous, since they are both obtained from the same signal f0.

An advantage of the present invention is that by means of the increment table contained in register 32, it is particularly easy to guarantee that the distortion performed will have a desired mean value, for example, a null mean value on the scanning line.

Another advantage of the present invention is that the device so obtained is entirely programmable. Thus, it is possible, based on a same integrated circuit, to perform an image compression or expansion according to the television set where the circuit is to be mounted.

Another advantage of the programmable conversion device according to the present invention is that it also enables performance of a conventional linear image distortion. All increments of table 32 only need to have the same value.

Figure 5:
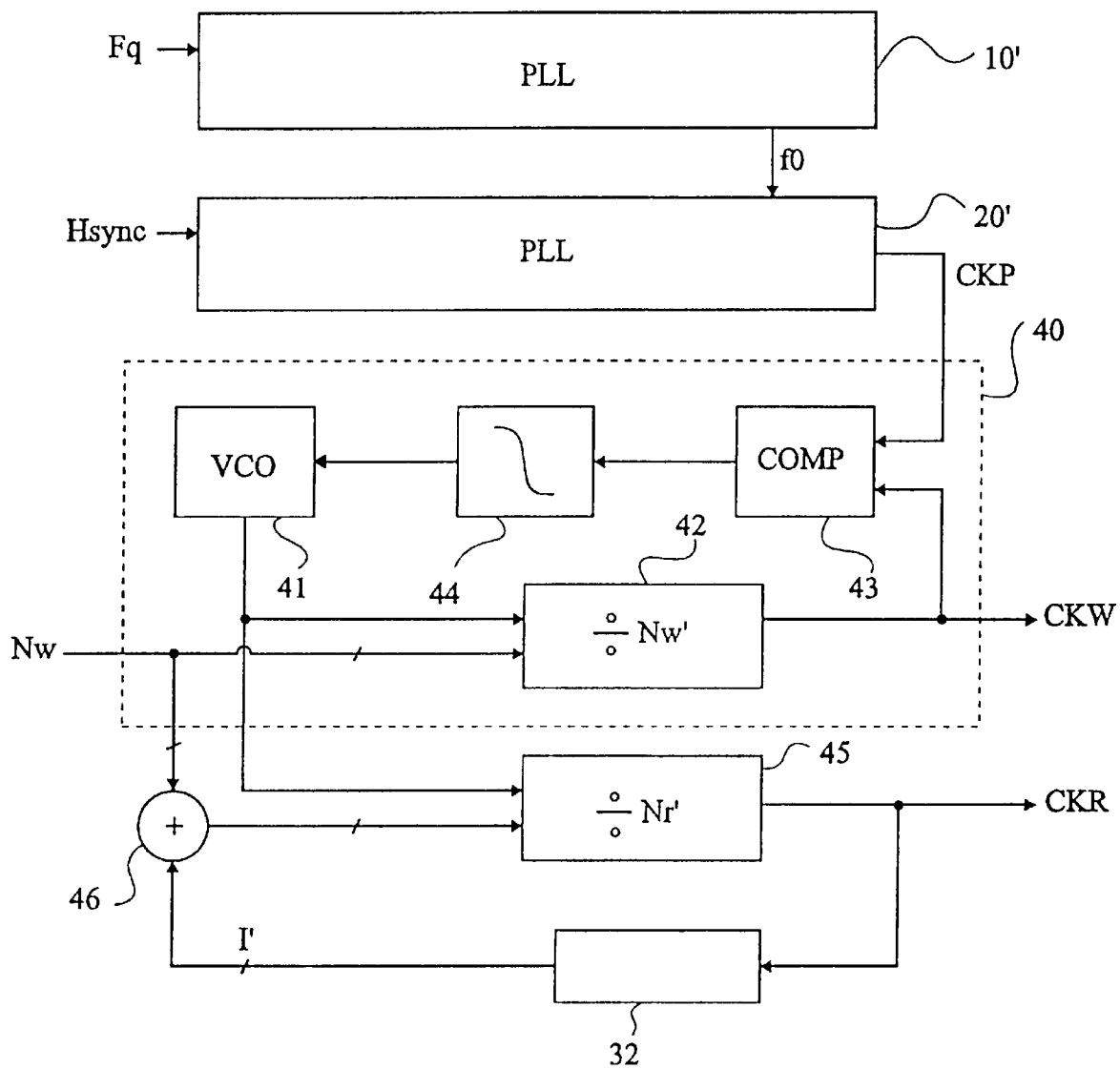
FIG. 5 shows a second embodiment of a programmable clock generation circuit of a conversion device according to the present invention.

FIG. 5 shows a second embodiment of a clock generation circuit according to the present invention.

According to this second embodiment, a pixel clock CKP of the received video signal is generated, which is controlled by the horizontal synchronization signal Hsync, and this acquisition pixel clock is used as a basis for obtaining the two clocks CKW and CKR.

The generation of clock CKP is performed by means of an analog PLL 10' and of a digital PLL 20'. Circuits 10' and 20' are similar to circuits 10 and 20 of FIG. 3, the division rate of divider 22 (FIG. 3) corresponding to the number P of pixels in a line.

Signal CKP is sent to a second analog PLL 40 for generating signal CKW. This PLL 40 includes a VCO 41 receiving an output signal of a low-pass filter 44 of output of a phase comparator 43. Comparator 43 receives, on a first input, signal CKP and, on a second input, an output of a divider 42, programmable by a constant number Nw', issuing signal CKW and receiving as an input an output of VCO 41.

The output signal of VCO 41 is also sent onto a divider 45 programmable by a variable number Nr' which issues signal CKR. Number Nr' is obtained by the sum 46 of number Nw' and of an increment (positive or negative) I' issued by an increment table 32, controlled by signal CKR.

Although this embodiment requires a second VCO, it has the advantage of using dividers 42 and 45 by integer numbers. Indeed, since signal CKP represents the frequency of the pixels of the received video signal, the use of synthesizers (21 and 31 in FIG. 3) performing fractional divisions is no longer necessary.

Another advantage of this second embodiment, relating to integer division, is that clock CKW has a constant period when loop 40 is locked, whereas, in the first embodiment, the period of signal CKW undergoes slight variations during a line.

According to an alternative embodiment of the invention, the signal CKW can have a variable frequency and the signal CKR a fixed frequency. For such an embodiment, the above description remains by exchanging "CKW" and "CKR" and by adequately adapting the division rate. The analog/digital converter has to be adapted to the frequency variation range of signal CKW. This alternative embodiment can, for example, be used in applications in which the display frequency must be constant.

Of course, the present invention is likely to have various alterations, modifications, and improvements which will readily occur to those skilled in the art. In particular, the practical implementation of the different circuit components is within the abilities of those skilled in the art according to the functional indications given hereabove. Further, although reference has been made in the preceding description to two memories 1 and 2, it could be a single memory divided into areas. It should also be noted that the present invention applies whatever the television signal standard (PAL, SECAM, NTSC).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for converting a television image format including:

two memories for storing image lines, alternatively switched in the read and write mode; and a control circuit issuing to these memories a write frequency and a read frequency, wherein the control circuit includes programmable means for generating said frequencies controlled by a horizontal synchronization signal, the read frequency being programmed to follow a predefined variation law, a periodicity of which corresponds to the duration of one scanning line, and wherein the variation law is contained in a programmable table including increments to be added, at the rate of the read frequency, to a first division rate for obtaining the write frequency, to obtain a second division rate for obtaining the read frequency.

2. A device according to claim 1, wherein the variation law has a null mean value for a scanning line.

3. A device according to claim 1, wherein the programmable means include:

an analog phase-locked loop for issuing a reference frequency based on a quartz crystal oscillator;

a digital phase-locked loop for issuing, based on the reference frequency and on the first rate, the write frequency controlled by the horizontal synchronization signal, the first rate being a fractional number representing the mean rate of division of the reference frequency by the write frequency; and a digital circuit for generating the read frequency based on the reference frequency and on a second rate.

4. A device according to claim 3, wherein the digital loop and the circuit for generating the second frequency each include a frequency synthesizer receiving as an input the reference frequency and, respectively, the first and second rates.

5. A device according to claim 1, wherein the programmable means include:

a first analog phase-locked loop for issuing a reference frequency based on a quartz crystal oscillator;

a digital phase-locked loop for issuing, based on the reference frequency, a pixel clock controlled by the horizontal synchronization signal;

a second analog phase-locked loop for generating the write frequency based on the pixel clock, comprising a voltage controlled oscillator and a first divider programmable by the first rate, this first rate being an integer number; and a second divider, programmable by the second rate and issuing the read frequency based on a frequency issued by the voltage controlled oscillator, the second rate being an integer number.

6. A device according to claim 1, wherein said first fixed frequency is the write frequency, the second programmed frequency being the read frequency.

7. The device according to claim 1, wherein the variation law is non-linear.

8. A device for converting a television image format including:

two memories for storing image lines, alternatively switched in the read and write mode; and a control circuit issuing to these memories a write frequency and a read frequency, wherein the control circuit includes programmable means for generating said frequencies controlled by a horizontal synchronization signal, the read frequency being programmed to follow a predefined variation law, a periodicity of which corresponds to the duration of one scanning line, wherein the variation law is non-linear.

9. A system for converting a television image format, comprising:

two memories for storing image lines;

switches associated with said memories for determining memory selection in the read and write modes; and a control circuit for controlling said switches and for issuing a write frequency and a read frequency to said memories, said control circuit including:

a reference frequency circuit for establishing a reference frequency, a first circuit responsive to said reference frequency that is a fixed frequency, and a second circuit also responsive to said reference frequency for providing a second frequency that is programmed to follow a predefined variation law of the division rate used for obtaining the second frequency;

wherein the variation law is non-linear.

10. A system according to claim 9 wherein the second circuit includes a programmable table for containing the variation law.

11. A system according to claim 10 wherein the programmable table includes increments to be added, at the rate of the second frequency, to a first division rate for obtaining the first frequency, to a obtain a second division rate for obtaining the second frequency.

12. A system according to claim 11 wherein the variation law has a null mean value for a scanning line.

13. A system according to claim 9 wherein the reference frequency circuit includes an analog phase-locked loop.

14. A system according to claim 13 wherein said phase-locked loop issues said reference frequency based on a quartz crystal oscillator.

15. A system according to claim 9 wherein said reference frequency circuit includes a first analog phase-locked loop for issuing said reference frequency based on a quartz crystal.

16. A system according to claim 15 wherein said first circuit comprises a digital phaselocked loop for issuing, based on the reference frequency, a pixel clock controlled by a horizontal synchronization signal, and a second analog phase-locked loop for generating the first frequency based on the pixel clock, including a voltage control oscillator and a first divider programmable by the first rate, this first rate being an integer number.

17. A system according to claim 16 wherein said second circuit includes a second divider, programmable by the second rate and issuing the second frequency based on a frequency issued by the voltage control oscillator, the second rate being an integer number.

18. A system according to claim 9 wherein said first fixed frequency is the write frequency, the second programmed frequency being the read frequency.

19. A system for converting a television image format, comprising:

two memories for storing image lines;

switches associated with said memories for determining memory selection in the read and write modes; and a control circuit for controlling said switches and for issuing a write frequency and a read frequency to said memories, said control circuit including:

a reference frequency circuit for establishing a reference frequency, a first circuit responsive to said reference frequency that is a fixed frequency, and a second circuit also responsive to said reference frequency for providing a second frequency that is programmed to follow a predefined variation law of the division rate used for obtaining the second frequency;

wherein said first circuit comprises a digital phase-locked loop for issuing, based on the reference frequency and on the first rate, the first frequency controlled by a horizontal synchronization signal, the first rate being a fractional number representing the mean rate of division of the reference frequency by the first frequency.

20. A system according to claim 19 wherein said second circuit comprises a digital circuit for generating the second frequency based on the reference frequency and on a second rate.

21. A system for converting a television image format, comprising:

two memories for storing image lines;
switches associated with said memories for determining memory selection in the read and write modes; and
a control circuit for controlling said switches and for issuing a write frequency and a read frequency to said memories, said control circuit including:
a reference frequency circuit for establishing a reference frequency,
a first circuit responsive to said reference frequency that is a fixed frequency, and
a second circuit also responsive to said reference frequency for providing a second frequency that is programmed to follow a predefined variation law of the division rate used for obtaining the second frequency;
wherein both said first circuit and said second circuit include a frequency synthesizer receiving as an input the reference frequency and, respectively, first and second rates.

22. A system for converting a television image format, comprising:

two memories for storing image lines;
switches associated with said memories for determining memory selection in the read and write modes; and
a control circuit for controlling said switches and for issuing a write frequency and a read frequency to said memories, said control circuit including:
a reference frequency circuit for establishing a reference frequency,
a first circuit responsive to said reference frequency that is a fixed frequency, and
a second circuit also responsive to said reference frequency for providing a second frequency that is programmed to follow a predefined variation law of the division rate used for obtaining the second frequency;
wherein the first fixed frequency is the read frequency, the second programmed frequency being the write frequency.

23. A system for converting a television image format, comprising:

two memories for storing image lines;
switch means coupled to said two memories for alternatively switching said memories in the read and write modes; and
control means for controlling said switch means and for generating a write frequency and a read frequency for control of said memories, the control means including:
means for establishing a reference frequency,
first circuit means responsive to said reference frequency for providing a first frequency that is a fixed frequency, and
a second circuit means also responsive to said reference frequency for providing a second frequency that is programmed to follow a predefined variation law, a periodicity of which corresponds to a duration of one scanning line; wherein the variation law is non-linear.

24. A system according to claim 23 wherein said second circuit means includes a programmable table for containing the variation law.

25. A system according to claim 23 wherein the programmable table includes increments to be added, at the rate of the second frequency, to a first division rate for obtaining the first frequency, to a obtain a second division rate for obtaining the second frequency.

26. A system according to claim 25 wherein the variation law has a null mean value for a scanning line.

27. A system according to claim 25 wherein said means for establishing a reference frequency circuit includes an analog phase-locked loop for issuing said reference frequency based on a quartz crystal oscillator.

28. A system according to claim 27 wherein said first circuit means comprises a digital phase-locked loop for issuing, based on the reference frequency and on the first rate, the first frequency controlled by a horizontal synchronization signal, the first rate being a fractional number representing the mean rate of division of the reference frequency by the first frequency.

29. A system according to claim 28 wherein said second circuit means comprises a digital circuit for generating the second frequency based on the reference frequency and on a second rate.

30. A system according to claim 25 wherein said means for establishing a reference frequency comprises a first analog phase-locked loop for issuing said reference frequency.

31. A system according to claim 30 wherein said first circuit means comprises a digital phase-locked loop for issuing, based on the reference frequency, a pixel clock controlled by the horizontal synchronization signal, and a second analog phase-locked loop for generating the first frequency based on the pixel clock.

32. A system according to claim 23 wherein said second analog phase-locked loop comprises a voltage controlled oscillator and a first divider programmable by the first rate, this first rate being an integer number.

33. A system according to claim 23 wherein said second circuit means comprises a second divider, programmable by the second rate and issuing the second frequency based on a frequency issued by the voltage control oscillator, the second rate being an integer number.

34. A system according to claim 23 wherein said first fixed frequency is the write frequency, the second programmed frequency being the read frequency.

35. A system for converting a television image format, comprising:

two memories for storing image lines;
switch means coupled to said two memories for alternatively switching said memories in the read and write modes; and
control means for controlling said switch means and for generating a write frequency and a read frequency for control of said memories, the control means including:
means for establishing a reference frequency,
first circuit means responsive to said reference frequency for providing a first frequency that is a fixed frequency, and
a second circuit means also responsive to said reference frequency for providing a second frequency that is programmed to follow a predefined variation law, a periodicity of which corresponds to the duration of one scanning line;

wherein said first circuit means and said second circuit means each include a frequency synthesizer receiving as an input the reference frequency and, respectively, the first and second rates.

36. A system for converting a television image format, comprising:

two memories for storing image lines;

switch means coupled to said two memories for alternatively switching said memories in the read and write modes; and control means for controlling said switch means and for generating a write frequency and a read frequency for control of said memories, the control means including:
means for establishing a reference frequency,
first circuit means responsive to said reference frequency for providing a first frequency that is a fixed frequency, and
a second circuit means also responsive to said reference frequency for providing a second frequency that is programmed to follow a predefined variation law, a periodicity of which corresponds to the duration of one scanning line;

wherein said first fixed frequency is the read frequency, the second programmed frequency being the write frequency.

37. A method of converting a television image format, the method comprising:

storing image lines in two memories; and controlling said memories by:
alternatively switching said memories to read and write modes; and
generating a write frequency and a read frequency to control said memories by:
establishing a reference frequency;
generating a first frequency from said reference frequency, wherein the first frequency is a fixed frequency; and
generating a second frequency from said reference frequency, wherein the second frequency is programmed to follow a predefined variation law, a periodicity of which corresponds to a duration of one scanning line;
wherein the variation law is non-linear.

38. A method according to claim 37, wherein the step of controlling said memory further includes providing a programmable table which contains the variation law.

39. A method according to claim 38, wherein the programmable table includes increments to be added, at the rate of the second frequency, to a first division rate for obtaining the first frequency, to a obtain a second division rate for obtaining the second frequency.

40. A method according to claim 39 wherein the variation law has a null mean value for a scanning line.

41. A method according to claim 39, wherein the step of establishing a reference frequency circuit includes providing an analog phase-locked loop that issues said reference frequency based on a quartz crystal oscillator.

42. A method according to claim 41, wherein the step of generating a first frequency includes providing a digital phase-locked loop that issues, based on the reference frequency and on the first rate, the first frequency controlled by a horizontal synchronization signal, the first rate being a fractional number representing the mean rate of division of the reference frequency by the first frequency.

43. A method according to claim 42, wherein the step of generating a second frequency includes generating the second frequency based on the reference frequency and on the second rate.

44. A method according to claim 37, wherein the steps of generating the first frequency and the second frequency each include providing a frequency synthesizer that receives as an input the reference frequency and, respectively, the first and second rates.

45. A method according to claim 39, wherein the step of establishing a reference frequency includes providing a first analog phase-locked that issues said reference frequency.

46. A method according to claim 45, wherein the step of generating a first frequency includes providing a digital phase-locked loop that issues, based on the reference frequency, a pixel clock controlled by the horizontal synchronization signal, and a second analog phase-locked loop that generates the first frequency based on the pixel clock.

47. A method according to claim 46, wherein said second analog phase-locked loop comprises a voltage controlled oscillator and a first divider programmable by the first rate, this first rate being an integer number.

48. A method according to claim 37, wherein the step of generating a second frequency includes providing a second divider, programmable by the second rate and issuing the second frequency based on a frequency issued by the voltage control oscillator, the second rate being an integer number.

49. A method according to claim 37, wherein said first fixed frequency is the write frequency, the second programmed frequency being the read frequency.

50. A method according to claim 37 wherein said first fixed frequency is the read frequency, the second programmed frequency being the write frequency.

51. A control circuit for controlling at least one memory in a system for converting a television image format, wherein the circuit receives a synchronization signal at an input, generates at a first output a first fixed frequency signal, and generates at a second output a second frequency signal programmed to follow a non-linear variation law, and wherein the first and second frequency signals control the at least one memory.

52. The control circuit of claim 51, wherein the first and second frequency signals control read and write operations of the at least one memory.

53. The control circuit of claim 52, wherein the at least one memory store image lines of a television image.

54. The control circuit of claim 53, wherein the image is horizontally compressed, and wherein the synchronization signal is a horizontal synchronization signal.

55. The control circuit of claim 51, wherein the variation law is contained in a programmable table including increments to be added, at a rate of the second frequency signal, to a first division rate for obtaining the first frequency signal, to obtain a second division rate for obtaining the second frequency signal.

56. The control circuit of claim 51, wherein the at least one memory comprises two memories.

57. A method of controlling at least one memory in a system for converting a television image format, the method comprising:

receiving a synchronization signal;

generating a first fixed frequency signal; and generating a second frequency signal programmed to follow a predefined non-linear variation law; and using the first and second frequency signals to control the at least one memory.

58. The method of claim 57, wherein the first and second frequency signals control read and write operations of the at least one memory.

59. The method of claim 58, wherein the at least one memory stores image lines of a television image.

60. The method of claim 59, wherein the image is horizontally compressed, and wherein the synchronization signal is a horizontal synchroniation signal.

61. The method of claim 57, wherein the variation law is contained in a programmable table including increments to be added, at a rate of the second frequency signal, to a first division rate for obtaining the first frequency signal, to obtain a second division rate for obtaining the second frequency signal.

62. The method of claim 57, wherein the at least one memory comprises two memories.

63. A device for converting a television image format including:

two memories for storing image lines, alternatively switched in the read and write mode; and a control circuit issuing to these memories a write frequency and a read frequency, wherein the control circuit includes programmable means for generating said frequencies controlled by a horizontal synchronization signal, the read frequency being programmed to follow a predefined variation law, a periodicity of which corresponds to the duration of one scanning line, and wherein said first fixed frequency is the read frequency, the second programmed frequency being the write frequency.

* * * * *

UNITED STATES PATENT AND TRADEMARK OFFICE
CERTIFICATE OF CORRECTION

PATENT NO. : 5,943,098
DATED : August 24, 1999
INVENTOR(S) : Jean-Pierre Lagarde and Patrice Leurent It is certified that error appears in the above-identified patent and that said Letters Patent is hereby corrected as shown below:

On the title page, item [75] should read:

[75] Inventor: Jean-Pierre Lagarde, Laval; Patrice Leurent, Saint Egreve both of France.

Col. 1, line 64, should read:
    selecting, for each line, which of memories 1 and 2 is
Col. 2, line 2, should read:
    for example memory 2, is read at the rate of a second
Col. 2, line 15, should read:
    a non-linear expansion, its frequency is lower than that of clock
Col. 2, line 52, should read:
    07298086 disclose conversion devices using an analog
Claim 60, col. 13, line 5, should read:
    signal is a horizontal synchronization signal.

Signed and Sealed this

Fourth Day of January, 2000

Attest:

Attesting Officer

*Acting Commissioner of Patents and Trademarks*